United States Patent [19]

Saito et al.

[11] 4,298,131
[45] Nov. 3, 1981

[54] POT LID

[76] Inventors: Shoji Saito, 2-227 Kofudai, Ichihara; Mitsuo Nagashima, 4-53-14 Maruyama, Funabashi, both of Japan

[21] Appl. No.: 189,140

[22] Filed: Sep. 22, 1980

[30] Foreign Application Priority Data

Apr. 2, 1980 [JP] Japan ................................. 55-44354

[51] Int. Cl.³ ............................................ B65D 51/16
[52] U.S. Cl. .................................... 220/231; 126/384; 220/369
[58] Field of Search ............... 220/231, 327, 368, 369, 220/329; 126/384, 299 C

[56] References Cited

U.S. PATENT DOCUMENTS

| | | | |
|---|---|---|---|
| 738,986 | 9/1903 | Covert | 126/384 |
| 1,927,780 | 9/1933 | Anderson | 220/237 |
| 2,219,498 | 10/1940 | Steyaert | 220/231 |
| 2,272,178 | 2/1942 | McDowell | 220/327 |
| 2,428,894 | 10/1947 | Serio | 220/231 |
| 2,960,250 | 12/1960 | Haloski | 220/231 |
| 4,091,956 | 5/1978 | Vecchio | 220/231 |

Primary Examiner—George E. Lowrance
Attorney, Agent, or Firm—Fleit & Jacobson

[57] ABSTRACT

A pot lid adaptable to a cookpot for boiling down foods such as fish, meat and the like. The pot lid has a plate having a contour adaptable to the cookpot, and a cover detachably installed on an upper surface of the plate. The plate has a threaded hole at its center, openings for releasing steam and grooves which extend to the circumferential end of the plate. The cover has a diameter large enough to close the openings and a rod projecting downwardly. The rod has a threaded groove at its end portion with an ungrooved portion being left above the threaded groove. The threaded groove is engageable with the threaded hole of the plate. When in use, the ungrooved portion of the rod is slidably held within the threaded hole of the plate to permit a heated broth of the boiled foods to discharge from at least the openings.

4 Claims, 3 Drawing Figures

POT LID

BACKGROUND OF THE INVENTION

The present invention relates to a lid or cover used for a cooking utensil and more particularly to a pot lid of the type used for boiling down foods such as fish, meat or the like so that the broth of the boiled food circulates and permeates into the boiled broth of the foods.

When a stew or hotch-potch of fish, meat, vegetables, etc. is obtained, it is generally known to use a wood or metal lid, which has a diameter slightly smaller than that of a cookpot, directly on the foods to be boiled. It is also known that the lid will be pushed upward when the foods are boiled, resulting in an overflow of the broth.

An attempt has been made to avoid such a disadvantage as overflowing of the broth, in which a hole is formed at the center of the lid with a handle or grip being disposed on the upper surface of the lid. This lid can successfully avoid the overflowing of the broth since the steam pressure produced below the lid can be passed through the hole.

However, the abovementioned lid results in a lengthening of the cooking time due to the escape of the steam pressure although shortening of boiling time is one of the seeking effects of the lid of the type concerned. Namely, the above-mentioned attempt has failed to maintain optimum efficiency under the conflicting effect of less-overflowing. Further, the conventional lids described above present a disadvantage that the skin or surface of the boiled fish is removed or ripped off when the lids are removed from the cookpot since a lid area contacting the boiled fish is relatively large.

SUMMARY OF THE INVENTION

An object of the present invention is to provide an improved lid of the kind which is used for boiling down foods such as fish, meat or the like so that the broth of the foods circulates and permeates into the boiling foods.

Another object of the present invention is to provide a lid of the type concerned, which can reduce the boiling time without an overflow of the broth.

Another object of the present invention is to provide a lid of the type concerned, which can present optimum efficiency without possibility of ripping-off of fish skin.

Briefly, a pot lid, according to the present invention, of the type which is adapted to a cookpot for boiling down foods comprises a plate having a contour adaptable to the cookpot and a cover releasably connected to an upper surface of the plate. The plate has a threaded hole at its central portion, openings at an outer circumference of the threaded hole and grooves extending to a circumferential end of the plate. The grooves are preferably extending radially at regular intervals. The cover has a diameter large enough to close the openings of the plate, a grip on its upper portion and a rod projecting downwardly from a lower central portion of the cover. The rod has at its lower end portion a threaded groove which will mate with the threaded hole of the plate and an ungrooved portion above the threaded groove. The ungrooved portion is slightly held within the threaded hole of the plate to permit a heated broth of the boiled foods to discharge from at least the openings of the plate. The plate is preferably curved at it extends to form a dome-like structure. Preferably, the cover has an inner surface snugly fit to the outer surface of the plate to thereby close the openings of the plate.

Other objects and features of the present invention will become apparent from the detailed description of a preferred embodiment thereof, which will be made with reference to the accompanying drawing. It is to be understood that the drawing and accompanying description are for the purpose of illustration only and do not limit the invention.

DETAILED DESCRIPTION OF THE INVENTION

Figure 1:
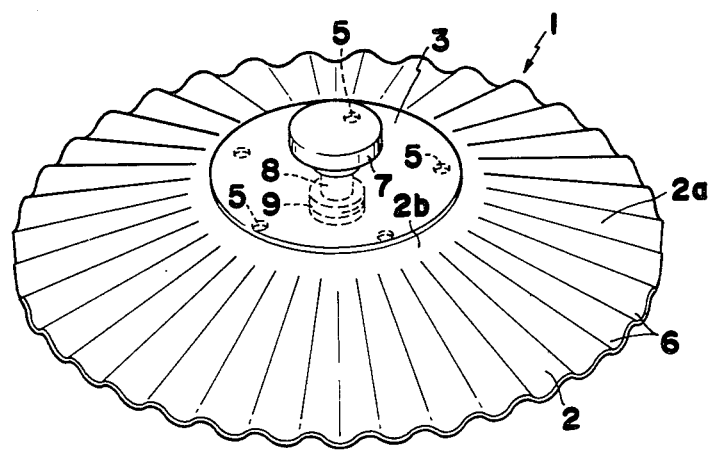
FIG. 1 is a perspective view of a lid embodying the present invention.
Figure 2:
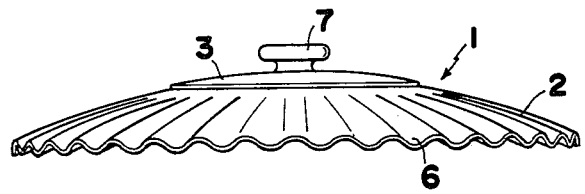
FIG. 2 is a front view of the lid illustrated in FIG. 1.
Figure 3:
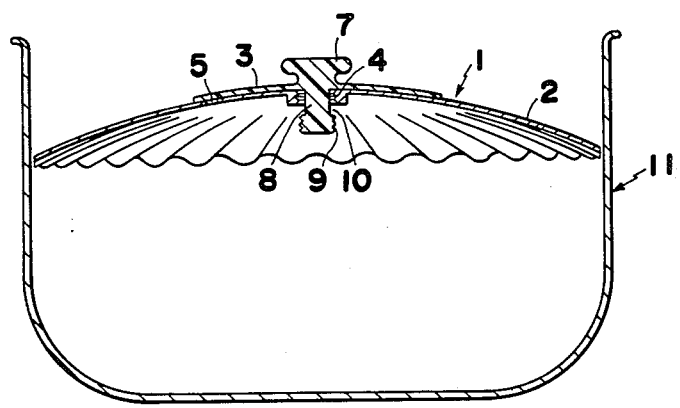
FIG. 3 is a partly sectional view of the lid, showing the lid applied to a cookpot for use.

Referring to the drawing, a lid which is generally designated at 1 has a circular plate 2 made of transparent synthetic resins such as polycarbonate and a circular cover 3 of a similar plastics. The circular plate 2 has a generally spherical surface and a threaded hole 4 at its center as illustrated in FIG. 3. A plurality of apertures 5 are provided randomly or otherwise regularly at the outer circumferential area of the threaded hole 4. The circular plate 2 has a plurality of grooves 6 extending from the portion adjacent the apertures 5 to the circumferential end of the circular plate 2 to form a waved portion 2a and a non-waxed portion 2b. The grooves 6 become deeper as they extend to the circumferential end of the plate 2.

The circular cover 3 has a spherical inner surface which meets with or snugly fits to the spherical outer surface of the circular plate 2, and a diameter large enough to cover or seal the apertures 5 disposed on the plate 2. The circular cover 3 has a grip 7 on its central upper surface and a rod 8 extending downwardly from the central lower surface of the cover 3. The rod 8 has threaded grooves 9 around its lower end portion with a non-grooved portion 10 being left above the threaded grooves 9. The threaded grooves 9 are formed so as to mate with the threaded hole 4, and the non-grooved portion 10 is freely movable in the axial direction of the rod 8 within the threaded hole 4 by a maximum length of the portion 10 when an upward pressure is given to the circular cover 3. It will be understood that the apertures 5 and the threaded hole 4 closed by the circular cover 3 by its own weight are opened when the latter is moved upward.

An operation as well as the advantages of the lid according to the present invention will be described. First, the circular cover 3 is attached in position to the circular plate 2 by rotating the grip 7 until the engagement between the threaded hole and the threaded groove of the rod 9 become disengaged where the lower surface of the circular cover 3 closely contacts the upper surface of the circular plate 2. Thus the threaded hole 4 and apertures 5 are closed by the circular cover 3 by the weight of the latter.

Until the broth or water in the cookpan 11 is heated upto the boiling temperature, the threaded hole 4 as well as the apertures 5 are closed, and the steam pressure is maintained without leakage from these apertures and hole. This permits a shortening of the cooking time and results in energy-saving. When the broth is boiled, the cover 3 is shifted upward by the steam pressure to open the hole 4 and apertures 5 through which the boiled broth is discharged repeatedly. The discharged broth of boiled foods advances along the grooves of the circular plate 2 to return to the boiling substance within the cookpan. In this case, the broth returns to substantially all the inner circumference of the cookpan, and prevents scorching at any part of the circumference of the cookpan. Further, the grooved or wave-form structure of the circular plate 2, the grooves being deeper as they go toward the circumferential end, can avoid the disadvantage of skin-ripping of the boiled fish since the area which contacts the boiled food is relatively small.

Furthermore, since the circular plate 2 and the cover 3 are releasably connected together by means of the engagement between the threaded hole 4 and the threaded grooves 9, the lid of the present invention may readily be applied to another cookpot of different size or design by merely changing the circular plate 2 with another plate of different size or design.

Though the present invention has been described with reference to the preferred embodiment, many modifications and alterations may be made within the spirit of the present invention.

What is claimed is:

1. A pot lid for use with a vessel comprising:
   a plate having a central portion and an outer circumferential portion surrounding the central portion, the central portion having a threaded opening in the center thereof and a plurality of openings surrounding the threaded opening, the outer circumferential portion having a plurality of grooves formed therein extending to the outer side edges of the plate; and
   a cover member having a cover portion with a size sufficiently large to cover said plurality of openings, a grip protruding upwardly from a central region of the cover portion, and a rod projecting downwardly from said grip through an opening formed in the cover portion, said rod having a threaded end portion engageable with the threaded opening of said plate to thereby interconnect said plate and cover member, said rod further having an unthreaded portion positioned between said end portion and said grip so that said cover portion is guided by said unthreaded portion for movement between a first position covering said plurality of openings and a second position vertically spaced above said openings, said cover portion in said first position blocking fluid flow through said openings and being moved from said first position towards said second position by pressure increase within the vessel during heating thereof and being moved from said second position towards said first position by gravity.

2. A pot lid for use with a vessel having an opening with a predetermined internal diameter comprising:
   a plate having a central portion and an outer circumferential portion surrounding the central portion, the central portion having a threaded opening in the center thereof and a plurality of openings surrounding the threaded opening, the outer circumferential portion having a plurality of grooves formed therein extending to outer side edges of the plate, the outer dimensions of the plate being less than said predetermined internal diameter so that the plate is insertable into the vessel whereby the plate is positionable in contact with food within the vessel; and
   a cover member having a cover portion with a size sufficiently large to cover said plurality of openings, a grip protruding upwardly from a central region of the cover portion, and a rod projecting downwardly from said grip through an opening formed in the cover portion, said rod having a threaded end portion engageable with the threaded opening of said plate to thereby interconnect said plate and cover member, said rod further having an unthreaded portion positioned between said end portion and said grip so that said cover portion is guided by said unthreaded portion for movement between a first position covering said plurality of openings and a second position vertically spaced above said openings, said cover portion in said first position blocking fluid flow through said openings and being moved from said first position towards said second position by pressure increase within the vessel during heating thereof and being moved from said second position towards said first position by gravity.

3. The pot lid according to claim 1 or 2, in which said grooves extend radially and become deeper as they extend towards outer circumferential edges of said plate.

4. The pot lid according to claim 1 or 2, in which said plate has a spherical outer surface, said cover member having a spherical inner surface for a suitable fit to said outer surface of said plate.

* * * * *